(12) United States Patent
Brace et al.

(10) Patent No.: US 11,119,304 B2
(45) Date of Patent: *Sep. 14, 2021

(54) DETERMINING AN ERROR IN A MOVING DISTANCE OF A MICROSCOPE

(71) Applicant: VIAVI Solutions Inc., San Jose, CA (US)

(72) Inventors: Jay Brace, Seattle, WA (US); Porter McCain, Seattle, WA (US); Gordon Mackay, Seattle, WA (US); Andrew Parsons, Brier, WA (US)

(73) Assignee: VIAVI Solutions Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/742,070

(22) Filed: Jan. 14, 2020

(65) Prior Publication Data

US 2020/0150414 A1 May 14, 2020

Related U.S. Application Data

(63) Continuation of application No. 16/100,027, filed on Aug. 9, 2018, now Pat. No. 10,571,676.

(51) Int. Cl.
*G02B 21/36* (2006.01)
*G02B 21/00* (2006.01)

(52) U.S. Cl.
CPC ......... *G02B 21/367* (2013.01); *G02B 21/008* (2013.01); *G02B 21/0064* (2013.01); *G02B 21/361* (2013.01)

(58) Field of Classification Search
CPC .. G02B 21/0064; G02B 21/008; G02B 21/18; G02B 21/361; G02B 21/367
See application file for complete search history.

(56) References Cited

U.S. PATENT DOCUMENTS

| | | | |
|---|---|---|---|
| 6,309,601 B1 | 10/2001 | Juncosa et al. | |
| 10,571,676 B1* | 2/2020 | Brace .................. | G02B 21/008 |
| 2004/0125366 A1 | 7/2004 | Kiani et al. | |
| 2008/0308726 A1 | 12/2008 | Jaehnke et al. | |
| 2013/0229650 A1 | 9/2013 | Wilson et al. | |
| 2014/0118500 A1 | 5/2014 | Liu et al. | |
| 2014/0126778 A1 | 5/2014 | Yu | |
| 2015/0146967 A1 | 5/2015 | Miyamoto et al. | |
| 2017/0016829 A1* | 1/2017 | Swihart .............. | G01N 21/6454 |
| 2018/0053295 A1 | 2/2018 | Ryu et al. | |

OTHER PUBLICATIONS

Co-pending U.S. Appl. No. 16/100,027, filed Aug. 9, 2018.

* cited by examiner

*Primary Examiner* — Farzana Hossain
(74) *Attorney, Agent, or Firm* — Harrity & Hamty, LLP

(57) ABSTRACT

A device may capture, using a camera associated with the device, a first image of a first set of optical fibers associated with an optical connector within a field of view of the camera. The device may determine that an actual distance of a relative movement of the camera and the optical connector and an expected distance of the relative movement of the camera and the optical connector fail to match. The device may perform one or more actions after determining that the actual distance and the expected distance fail to match.

20 Claims, 14 Drawing Sheets

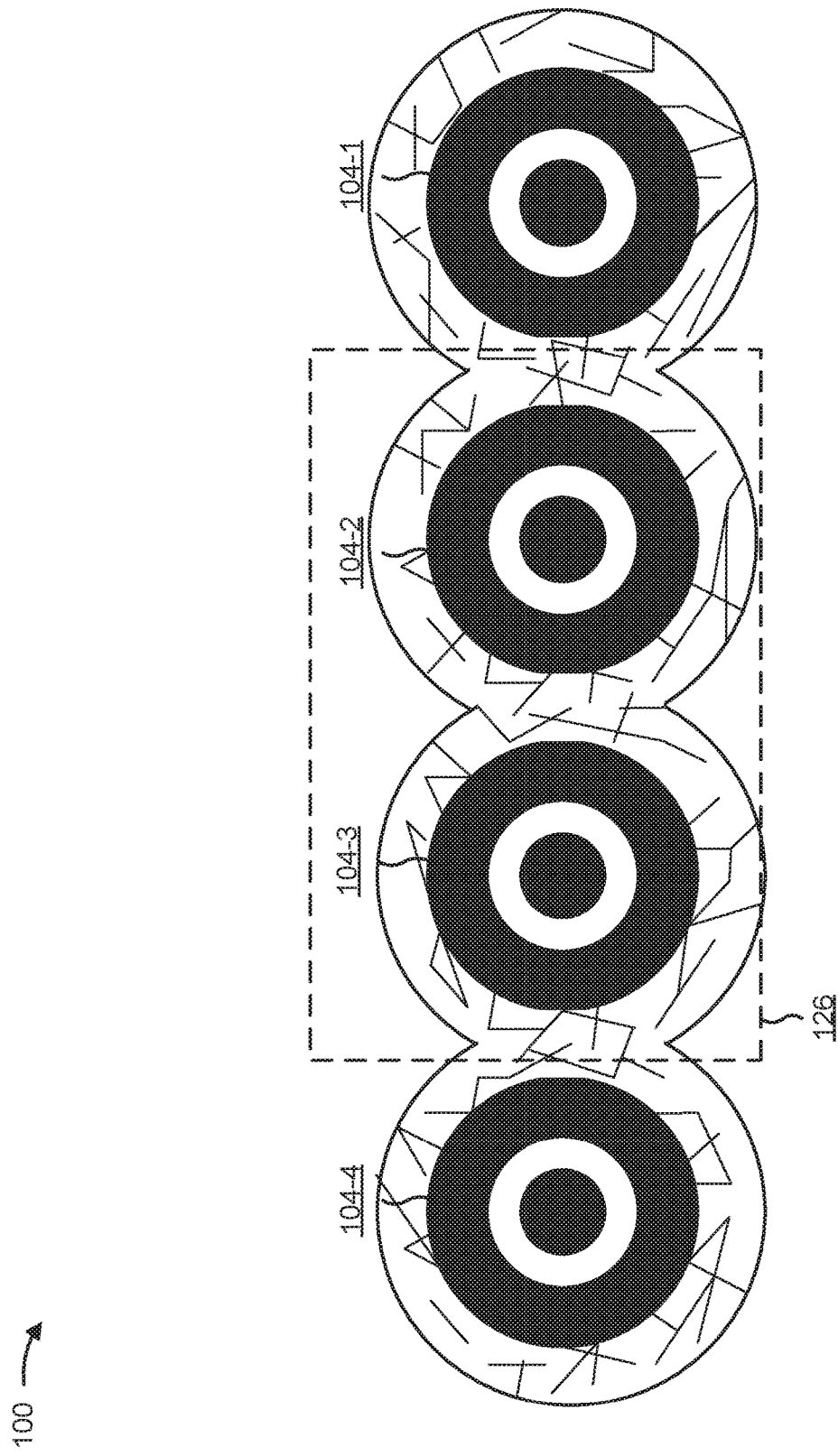

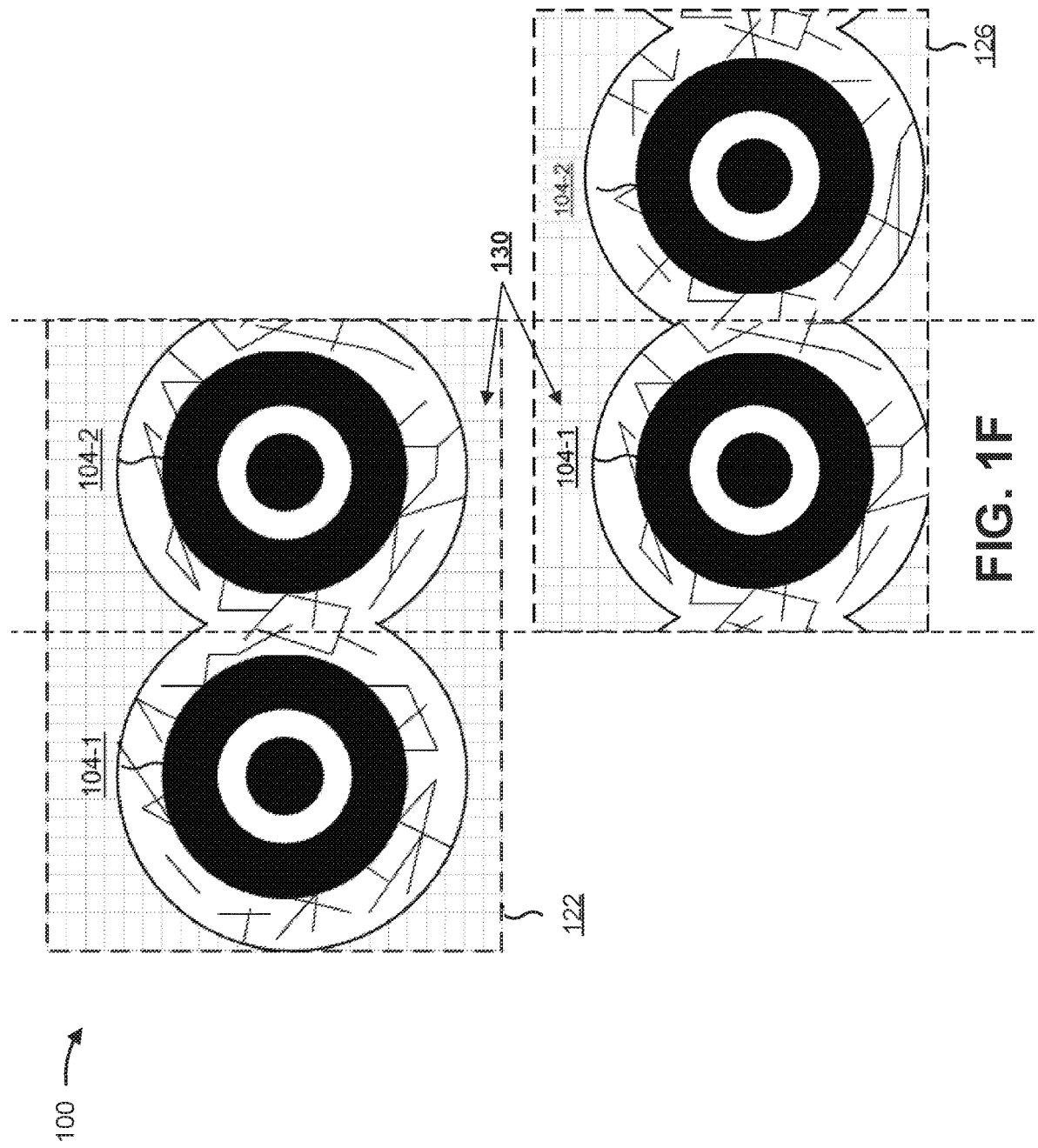

US 11,119,304 B2

DETERMINING AN ERROR IN A MOVING DISTANCE OF A MICROSCOPE

RELATED APPLICATION

This application is a continuation of U.S. patent application Ser. No. 16/100,027, filed Aug. 9, 2018, which is incorporated herein by reference.

BACKGROUND

A microscope may include an instrument used to see objects that are too small to be seen by the naked eye. Microscopy may include investigating small objects and structures using a microscope. A microscope may include an optical microscope, which uses light passed through a sample to produce an image, a fluorescence microscope, an electron microscope, a scanning probe microscope, and/or the like.

SUMMARY

According to some possible implementations, a method may include capturing, using a camera associated with a microscope, a first image of a first set of optical fibers associated with an optical connector within a field of view of the camera after performing a relative movement of the camera and the optical connector from a first position to a second position. The method may include performing, by the microscope, a comparison of the first image of the first set of optical fibers and a second image of a second set of optical fibers associated with the optical connector captured at the first position. The method may include determining, by the microscope, that an actual distance that the field of view of the camera was moved and an expected distance that the field of view of the camera was to be moved fail to match based on a result of performing the comparison. The method may include performing, by the microscope, one or more actions after determining that the actual distance and the expected distance fail to match.

According to some possible implementations, a device may include one or more memories; and one or more processors, communicatively coupled to the one or more memories, configured to capture, using a camera associated with the device, a first image of a first set of optical fibers associated with an optical connector within a field of view of the camera after moving the field of view of the camera from a first position to a second position. The one or more processors may be configured to determine that an actual distance of a relative movement of the camera and the optical connector and an expected distance of the relative movement of the camera and the optical connector fail to match after capturing the first image, wherein the expected distance is based on a configuration of an optical cable associated with the optical connector. The one or more processors may perform one or more actions after determining that the actual distance and the expected distance fail to match.

According to some possible implementations, a non-transitory computer-readable medium may store one or more instructions that, when executed by one or more processors, cause the one or more processors to capture, using a camera associated with a microscope, a first image of a first set of optical fibers associated with an optical connector within a field of view of the camera after performing a relative movement of the camera and the optical connector from a first position to a second position. The one or more instructions, when executed by the one or more processors, may cause the one or more processors to perform a comparison of the first image and a second image of a second set of optical fibers captured at the first position after capturing the first image. The one or more instructions, when executed by the one or more processors, may cause the one or more processors to determine whether an expected quantity of pixels overlap between the first image and the second image based on a result of performing the comparison. The one or more instructions, when executed by the one or more processors, may cause the one or more processors to determine that an actual distance of the relative movement and an expected distance of the relative movement fail to match after determining whether the expected quantity of pixels overlap. The one or more instructions, when executed by the one or more processors, may cause the one or more processors to perform one or more actions after determining that the actual distance and the expected distance fail to match.

BRIEF DESCRIPTION OF THE DRAWINGS

FIGS. 1A-1I are diagrams of an example implementation described herein.

DETAILED DESCRIPTION

Figure 1A:
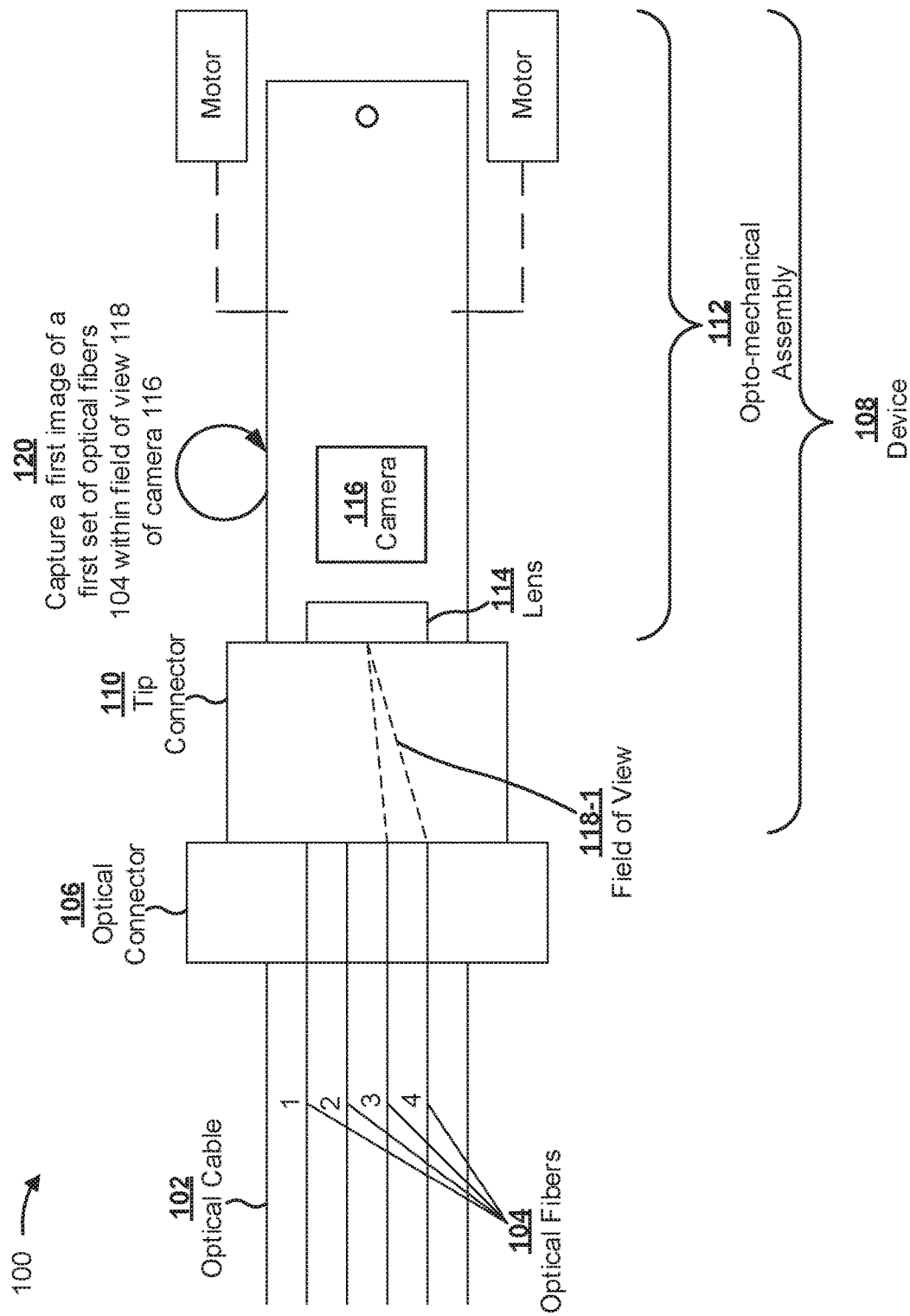

The following detailed description of example implementations refers to the accompanying drawings. The same reference numbers in different drawings may identify the same or similar elements.

A technician may use a device, such as an optical fiber microscope, to examine optical fibers of an optical cable. For example, the device may capture images of the optical fibers and may analyze the optical fibers for defects, damage, and/or the like. Continuing with the previous example, the device may need to move a camera a particular distance to move the camera from one position to another to capture images of different optical fibers.

However, mechanical variability in functioning of the device (e.g., accuracy of mechanical movement, wear of mechanical parts, and/or the like) and/or technician error (e.g., movement by the technician) may cause the device to erroneously move the camera associated with the device and thereby cause the device to fail to move the camera an expected distance (e.g., the device may move the camera less than an expected distance, more than an expected distance, and/or the like). This may cause the device to fail to capture images of some optical fibers included in the optical cable, may cause the device to conclude an analysis of the optical fibers prematurely (e.g., due to the device erroneously determining that the device has moved the camera an expected distance to capture images of all optical fibers of the optical cable), may cause the device to erroneously extend a duration of capturing of images based on determining that the device has not moved the camera an expected distance, and/or the like. This can increase an amount of time needed to capture images of the optical fibers, can consume excess power resources of the device, can consume excess computing resources of the device, and/or the like.

Some implementations described herein provide a device that is capable of processing images captured of optical fibers to uniquely identify the optical fibers shown in the images, such as based on identifying a unique visual pattern of interstitial material associated with the optical fibers shown in the images. This facilitates processing images captured of optical fibers and determining whether a camera that captured the images was moved an expected distance and/or whether the distance that the camera was moved is sufficient to capture a complete image of an optical fiber. In this way, the device may reduce, eliminate, or compensate for erroneous movement of a camera. This reduces or eliminates errors in movement of a camera, thereby improving capture of images of optical fibers. In addition, this conserves time resources and/or computing resources of the device that would otherwise be consumed re-capturing images of the optical fibers due to an error in a distance that the camera was moved.

Further, this reduces or eliminates a need for the technician to manually review images to determine whether a camera was moved an incorrect distance, thereby improving an efficiency of determining whether an error is present. Further, this conserves processing resources of the device via efficient identification and/or rectification of errors in a distance that a camera of the device was moved. In addition, this facilitates other types of actions, such as verifiability of maintenance and/or servicing of an optical cable and/or an optical fiber, provisioning of optical fiber-specific and/or optical cable-specific information for a technician during maintenance and/or servicing of an optical fiber and/or an optical cable, and/or the like, thereby improving maintenance and/or servicing of the optical fiber and/or the optical cable.

FIGS. 1A-1I are diagrams of an example implementation 100 described herein. As shown in FIG. 1A, implementation 100 may include an optical cable 102 that includes a set of optical fibers 104 (e.g., optical fibers 104-1 through 104-4), and an optical connector 106 that is attached to optical cable 102 (e.g., optical fibers 104 may be mounted in interstitial material within optical connector 106 connected to optical cable 102). Further, implementation 100 includes a device 108 (e.g., a handheld device 108) to be used to analyze optical fibers 104-1 through 104-4. Device 108 includes a tip connector 110 that permits device 108 to attach to optical cable 102 via optical connector 106. Further, device 108 includes an opto-mechanical assembly 112 to be used to move a microscope relative to optical fibers 104-1 through 104-4 to obtain (e.g., capture) a set of images and/or video of optical fibers 104-1 through 104-4 and/or to analyze optical fibers 104-1 through 104-4.

Opto-mechanical assembly 112 includes various components to be used to analyze optical fibers 104-1 through 104-4 (e.g., electronic components, optical components, mechanical components, and/or the like). For example, opt-mechanical assembly 112 may include a microscope that includes a lens 114 for viewing optical fibers 104-1 through 104-4. As further shown in FIG. 1A, the microscope of opto-mechanical assembly 112 may include a camera 116 to be used to capture a set of images and/or video of optical fibers 104-1 through 104-4. For example, camera 116 may capture a set of images and/or video that are to be analyzed by device 108 (or another device communicatively connected to device 108) to identify a defect, damage, and/or the like related to optical fibers 104-1 through 104-4. Continuing with the previous example, device 108 may provide the set of images and/or video to a server or a computing resource (e.g., of a cloud computing environment) to permit the server or computing resource to perform an analysis of the set of images and/or video. In some implementations, device 108 may use camera 116 to capture an image and/or video of objects within field of view 118 of camera 116.

As shown by reference number 120, device 108 may capture a first image of a first set of optical fibers 104 within field of view 118 of camera 116. For example, device 108 may capture a first image of a first set of optical fibers 104 within field of view 118-1 of camera 116.

In some implementations, device 108 may capture a single image of multiple optical fibers 104 when multiple optical fibers 104 are within field of view 118-1 of the camera 116. Conversely, device 108 may capture individual images of optical fibers 104 when multiple optical fibers 104 are within field of view 118-1 of camera 116.

In some implementations, device 108 may capture the first image after being connected to optical cable 102 via a mechanical connection between optical connector 106 and tip connector 110. Additionally, or alternatively, device 108 may capture the first image after a user of device 108 initiates operation of device 108 by selection of a physical button associated with device 108, by selection of a button associated with a user interface provided for display via a display associated with device 108, and/or the like (e.g., after initiating an analysis of optical fibers 104 of optical cable 102).

In some implementations, device 108 may capture the first image after automatically moving into the position shown in FIG. 1A. For example, device 108 may determine an edge of optical fibers 104 of optical cable 102 by moving camera 116 in a particular direction until device 108 moves camera 116 a threshold distance without another optical fiber 104 being brought within field of view 118-1 of camera 116 (e.g., using an image processing technique in a manner similar to that described below). In this way, device 108 may be positioned to capture an image of optical fibers 104 included in optical cable 102 in order (e.g., by moving camera 116 in a particular direction). In some implementations, optical cable 102 (and/or optical connector 106) may be moved relative to device 108 such that optical fibers 104 are brought within field of view 118-1 (e.g., via a relative movement of optical cable 102 (and/or optical connector 106) and camera 116), In some implementations, device 108 may include a set of components that is configured to move optical cable 102 (and/or optical connector 106) in this manner.

In some implementations, device 108 may capture multiple images of optical fibers 104 within field of view 118-1 and may select one of the captured images for later comparison. For example, device 108 may select an image where a set of optical fibers 104 within field of view 118-1 is centered within field of view 118-1, is entirely within field of view 118-1 of the camera 116, and/or the like. Additionally, or alternatively, and as another example, device 108 may select an image of the set of optical fibers 104 within field of view 118-1 that has a highest resolution or a highest quality relative to other captured images of the set of optical fibers 104 within field of view 118-1.

In some implementations, device 108 may capture the first image of the first set of optical fibers 104 within field of view 118-1 after determining that the first set of optical fibers 104 is substantially centered in field of view 118-1. For example, after moving camera 116 into a position associated with field of view 118-1, device 108 may capture an initial image and may process the initial image to determine whether the set of optical fibers 104 is substantially centered within field of view 118-1. Continuing with the previous example, device 108 may process the initial image using a feature detection technique, a pattern matching technique, a shape detection technique, and/or the like to identify the first set of optical fibers 104 in the initial image and/or to determine whether the first set of optical fibers 104 is substantially centered in field of view 118-1. This improves a comparison of an image of a set of optical fibers 104 and another image of another set of optical fibers 104 by causing the image and the other image to be structured in a similar manner, described elsewhere herein.

In some implementations, device 108 may adjust field of view 118-1 based on determining that the first set of optical fibers 104 is not substantially centered within field of view 118-1 (e.g., by moving camera 116, by moving optical cable 102 and/or optical connector 106, and/or the like). For example, device 108 may determine a quantity of pixels that the first set of optical fibers 104 is from being substantially centered (e.g., a quantity of pixels that a center of an optical fiber 104 is from a center of the initial image when a single optical fiber 104 or an odd quantity of optical fibers 104 is within field of view 118-1, a quantity of pixels that a point between two optical fibers 104 is from a center of the initial image when an even quantity of optical fibers 104 is within field of view 118-1, and/or the like).

In some implementations, and continuing with the previous example, a pixel may show an amount of distance of optical cable 102. (e.g., a quantity of millimeters, a quantity of inches, and/or the like) based on a distance of camera 116 from optical cable 102, an amount of zoom implemented by camera 116, a resolution of camera 116, and/or the like. In some implementations, based on this, device 108 may determine an amount of distance camera 116 is to be adjusted such that the first set of optical fibers 104 is within field of view 118-1 and may adjust camera 116 by the amount so that the first set of optical fibers 104 is substantially centered within field of view 118-1. In some implementations, adjusting camera 116 may include moving camera 116 in a side-to-side direction, in an up-and-down direction, closer to the first set of optical fibers 104, further from the first set of optical fibers 104, and/or the like.

Figure 1B:
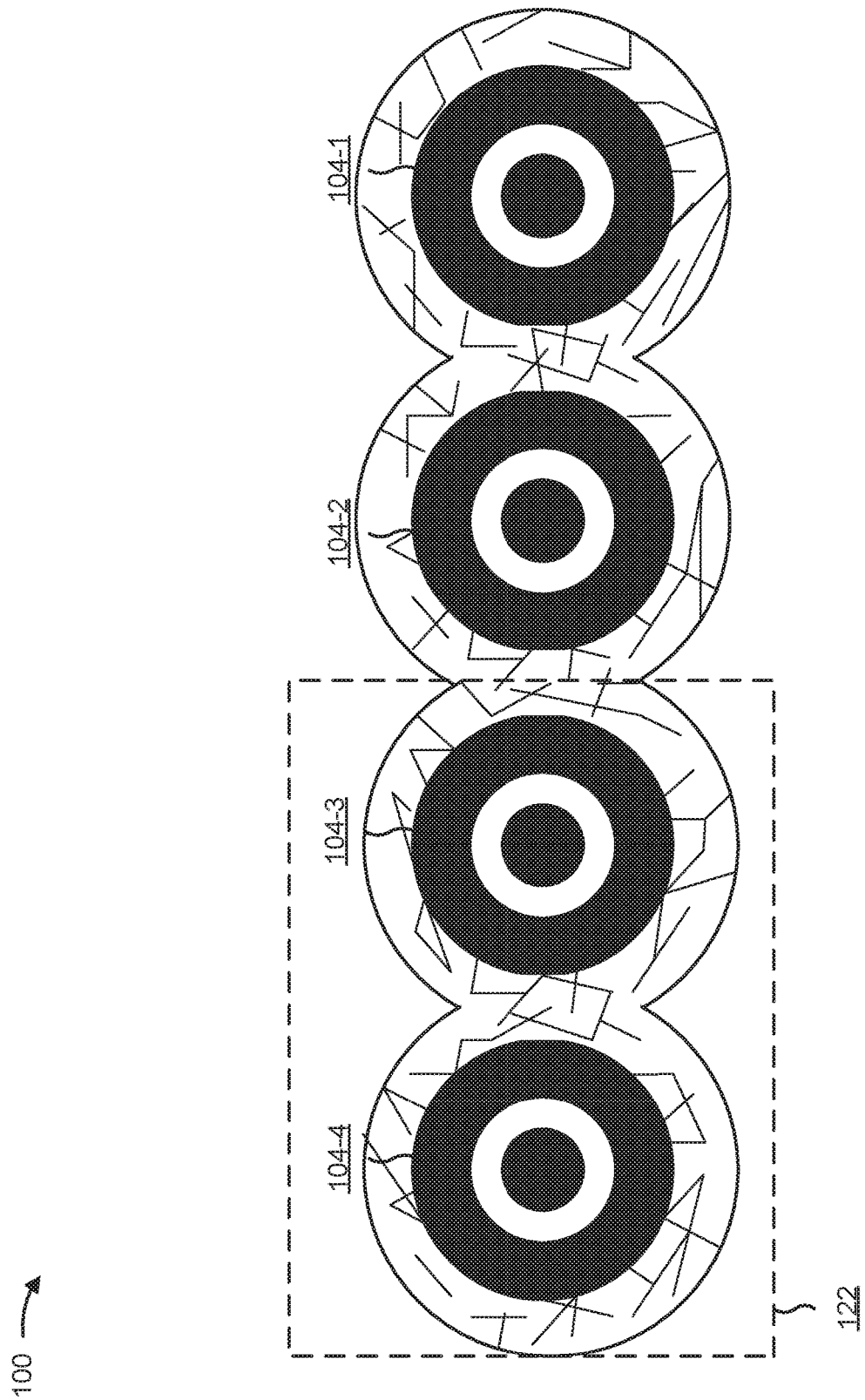

Turning to FIG. 1B, and as shown by reference number 122, device 108 may capture the first image of the first set of optical fibers 104 in field of view 118-1 of camera 116, For example, assuming that optical fibers 104-3 and 104-4 are within field of view 118-1 of camera 116, then device 108 may capture the first image of optical fibers 104-3 and 104-4. As further shown in FIG. 1B, the first image may show an entirety of the first set of optical fibers 104. In some implementations, device 108 may determine a distance shown in the first image. For example, device 108 may determine a distance shown in the first image based on a quantity of pixels shown in the first image. In some implementations, when the first image is first in a series of images of optical cable 102, such as when the first image is of an optical fiber 104 at a boundary of optical cable 102, then device 108 may determine a distance of optical cable 102 shown in the first image from the boundary of optical cable 102. In some implementations, device 108 may use this distance to determine whether device 108 has moved camera 116 an expected distance, as described elsewhere herein.

In some implementations, the first image may show interstitial material associated with optical fibers 104-3 and 104-4 (e.g., shown by the black lines associated with optical fibers 104-3 and 104-4). For example, the interstitial material may comprise crushed glass, plastic, and/or the like, which may form a non-uniform pattern. In some implementations, the non-uniform pattern may be unique to optical cable 102, to a particular optical fiber 104, and/or the like. In some implementations, device 108 may process the first image, using an image processing technique, similar to that described elsewhere herein, to identify a unique visual pattern of the interstitial material shown in the first image. In some implementations, device 108 may use the unique visual pattern shown in the image to uniquely identify optical cable 102 and/or optical fibers 104 shown in the first image, to determine whether device 108 has moved camera 116 an expected amount, and/or the like.

Figure 1C:
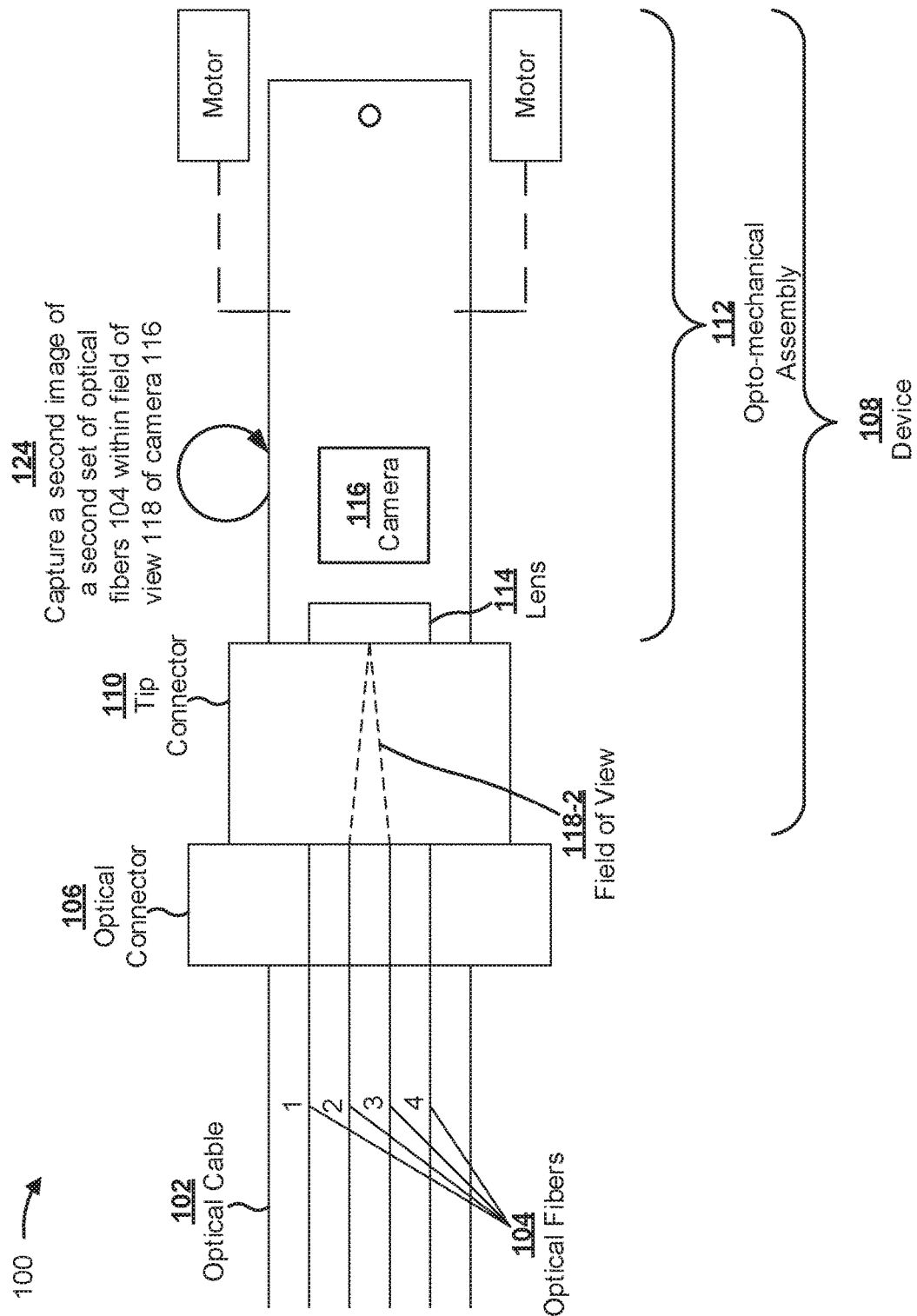

Turning to FIG. 1C, and as shown by reference number 124, device 108 may capture a second image of a second set of optical fibers 104 within field of view 118 of camera 116. For example, device 108 may capture a second image of a second set of optical fibers 104 within field of view 118-2 of camera 116, in a manner similar to that described elsewhere herein.

In some implementations, device 108 may capture the second image after moving camera 116 into a position associated with field of view 118-2 (and/or after moving optical cable 102 and/or optical connector 106 within field of view 118-2). In some implementations, the position associated with field of view 118-2 may be an unexpected position. For example, device 108 may be configured such that device 108 is to move camera 116 a threshold distance such that a second set of optical fibers 104 is within field of view 118 of camera 116. For example, device 108 may be configured such that the amount of distance that device 108 moves camera 116 (and/or optical cable 102 and/or optical connector 106) facilitates capture of each optical fiber 104 in an image such that each optical fiber 104 is entirely shown in an image, such that there is no overlap (or a particular amount of overlap) between images, such that all optical fibers 104 of optical cable 102 are shown in an image, and/or the like (e.g., based on a configuration of optical cable 102, based on an amount of distance within field of view 118, and/or the like), and/or the like.

However, and as shown in FIG. 1C, the second set of optical fibers 104 within field of view 118-2 may include an overlap with the first set of optical fibers 104 within field of view 118-1 shown in FIG. 1A (e.g., optical fiber 104-3 may be within both field of view 118-1 and field of view 118-2). In other words, optical fibers 104-1 and 104-2 may be expected to be within field of view 118-2 (e.g., an expected set of optical fibers 104), but optical fibers 104-2 and 104-3 are actually within field of view 118-2 (e.g., an actual set of optical fibers 104), such as due to an error in a movement of camera 116 of device 108 (and/or due to an error in movement of optical cable 102 and/or optical connector 106). For example, device 108 may have failed to move camera 116 an expected distance such that there is overlap between field of view 118-1 and 118-2, movement of device 108 by a user of device 108 may have caused field of view 118-2 to fail to include an expected set of optical fibers 104, and/or the like. In other cases, device 108 and/or movement by a technician may cause camera 116 to move more than an expected distance, thereby causing field of view 118-2 to fail to include an expected set of optical fibers 104.

Turning to FIG. 1D, and as shown by reference number 126, the second image that device 108 captures may be an image of optical fibers 104-2 and 104-3. For example, assuming that optical fibers 104-2 and 104-3 are within field of view 118-2, the device 108 may capture the second image of optical fibers 104-2 and 104-3. As further shown in FIG. 1D, the second image may show an entirety of the second set of optical fibers 104.

Figure 1E:
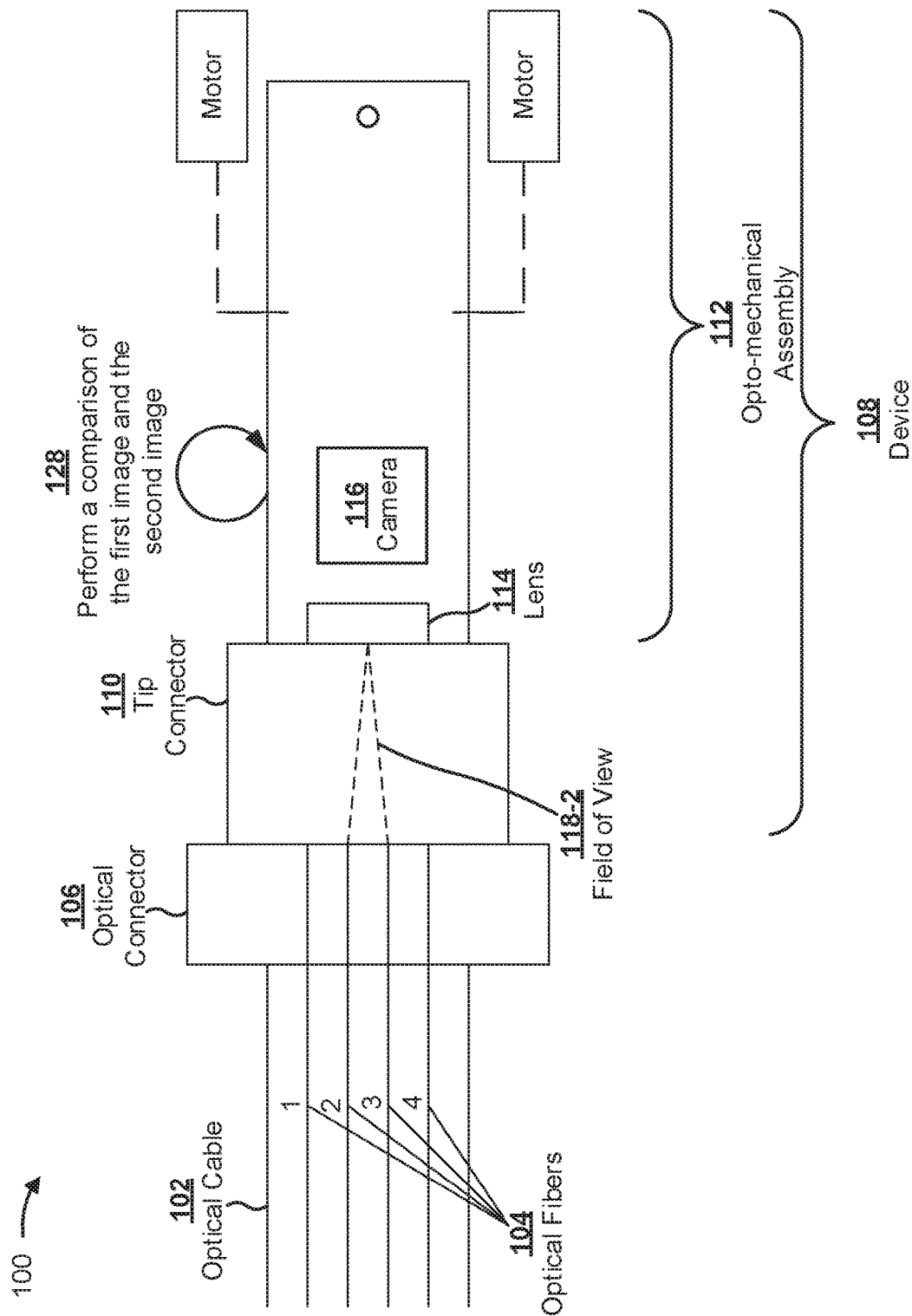

Turning to FIG. 1E, and as shown by reference number 128, device 108 may perform a comparison of the first image and the second image (e.g., of the first image shown by reference number 122 in FIG. 1B, and the second image shown by reference number 126 in FIG. 1D). For example, device 108 may perform a comparison of a unique visual pattern of interstitial material shown in the first image and a second unique visual pattern of interstitial material shown in the second image. Additionally, or alternatively, device 108 may perform a comparison of optical fibers 104 shown in the first image and the optical fibers 104 shown in the second image.

In some implementations, device 108 determine whether respective portions of the first image and the second image overlap. For example, device 108 may determine whether the first image and the second image show portions of a same optical fiber 104, overlapping portions of optical cable 102, and/or the like. Additionally, or alternatively, and as another example, device 108 may determine whether respective pixels of the first image and the second image match. In some implementations, device 108 may determine whether respective portions of the first image and the second image overlap after aligning the first image and the second image (e.g., aligning the first image and the second image vertically with each other, overlaying the first image and the second image, and/or the like).

In some implementations, device 108 may determine an amount of overlap between the first image and the second image. For example, device 108 may determine a percentage of the first image and the second image that overlap, a quantity of pixels between the first image and the second image that overlap, and/or the like. In some implementations, device 108 may determine whether the amount of overlap satisfies a threshold. For example, depending on a configuration of device 108, there may be some overlap between two images when there is no error in the movement of camera 116.

In some implementations, device 108 may determine an amount of distance that overlaps between the first image and the second image. For example, a percentage of overlap between the first image and the second image, a quantity of pixels that overlaps between the first image and the second image, and/or the like may correspond to an amount of distance of optical cable 102 that is shown in both the first image and the second image. In some implementations, based on this, device 108 may determine a distance camera 116 has moved from a first position associated with field of view 118-1 to a second position associated with field of view 118-2.

In some implementations, device 108 may determine that an error has occurred with respect to moving camera 116 based on determining the distance that device 108 has moved camera 116. For example, device 108 may determine that an error has occurred with respect to moving camera 116 (e.g., that camera 116 has been moved less than an expected distance) when the first image and the second image overlap, when an amount of overlap between the first image and the second image overlap satisfies a threshold, when a portion of the first image and a portion of the second image show a threshold amount of a same distance, when an amount of overlap between the first image and the second image indicates that device 108 failed to move camera 116 an expected amount (e.g., moved camera 116 less than an expected distance, moved camera 116 more than an expected distance, and/or the like), and/or the like.

In some implementations, device 108 may determine whether the first image and the second image fail to overlap and/or fail to overlap by a threshold amount (e.g., indicating that camera 116 has been moved more than an expected distance). For example, if device 108 is configured to capture images of consecutive sets of optical fibers 104 that are located next to each other in optical cable 102, then there may be some overlap between images that device 108 captures based on the sets of optical fibers 104 being located next to each other and/or depending on a size of field of view 118 of camera 116. In some implementations, device 108 may determine an error with respect to moving camera 116 if the first image and the second image fail to overlap, if the first image and the second image overlap by an amount that fails to satisfy a threshold, and/or the like (e.g., indicating that device 108 failed to move camera 116 an expected distance).

In some implementations, device 108 may determine an expected distance that camera 116 was to be moved (e.g., an expected distance of a relative movement of camera 116 and optical cable 102 and/or optical connector 106). For example, device 108 may determine an expected distance based on a configuration of optical cable 102 (e.g., device 108 may determine an expected distance to move based on a total distance of optical cable 102 and a total quantity of optical fibers 104 to be shown in each image), input from a user of device 108, and/or the like. In some implementations, and similar to that described elsewhere herein, device 108 may determine that an actual distance that device 108 moved camera 116 (e.g., an actual distance of a relative movement of camera 116 and optical cable 102 and/or optical connector 106) fails to match an expected distance that camera 116 was to be moved (e.g., was moved more than an expected distance, was moved less than an expected distance, and/or the like).

In some implementations, device 108 may process the first image and/or the second image using an image processing technique in association with performing the comparison. For example, device 108 may process the first image and/or the second image using the image processing technique prior to performing the comparison of the first image and the second image, while performing the comparison of the first image and the second image, and/or the like. In some implementations, an image processing technique may include a feature detection technique, a blob detection technique, a histogram matching technique, a scale-invariant feature transform (SIFT) technique, a simultaneous localization mapping (SLAM) technique, a homography technique, and/or the like.

In some implementations, device 108 may use the image processing technique to identify optical fibers 104 in field of view 118 of camera 116, in the first image and/or the second image, and/or the like. For example, device 108 may use the image processing technique to identify a pattern of concentric rings that is indicative of an optical fiber 104, to determine whether a set of optical fibers 104 in field of view 118 is substantially centered within field of view 118, and/or the like. Additionally, or alternatively, device 108 may use the image processing technique to identify a unique visual pattern of interstitial material shown in the first image and/or the second image.

Additionally, or alternatively, device 108 may use the image processing technique to compensate for different angles of capture of the first image and the second image. For example, camera 116 may be moved via a pivot motion about an axis. In this case, images of different sets of optical fibers 104 may be captured from different angles relative to the different sets of optical fibers 104, which increases a difficulty of performing a comparison of the different images. As a result, device 108 may process the different images using an image processing technique to compensate for the different angles at which the different images were captured (e.g., to compensate for distortions of optical fibers 104 and/or interstitial material shown in the different images due to the different angles).

FIG. 1F shows an example of performing a comparison of the first image (shown by reference number 122) and the second image (shown by reference number 126). For example, and as shown by reference number 130, device 108 may align the first image and the second image prior to performing a comparison of the first image and the second image. Continuing with the previous example, and as further shown by reference number 130, device 108 may identify respective portions of the first image and the second image that overlap.

Figure 1G:
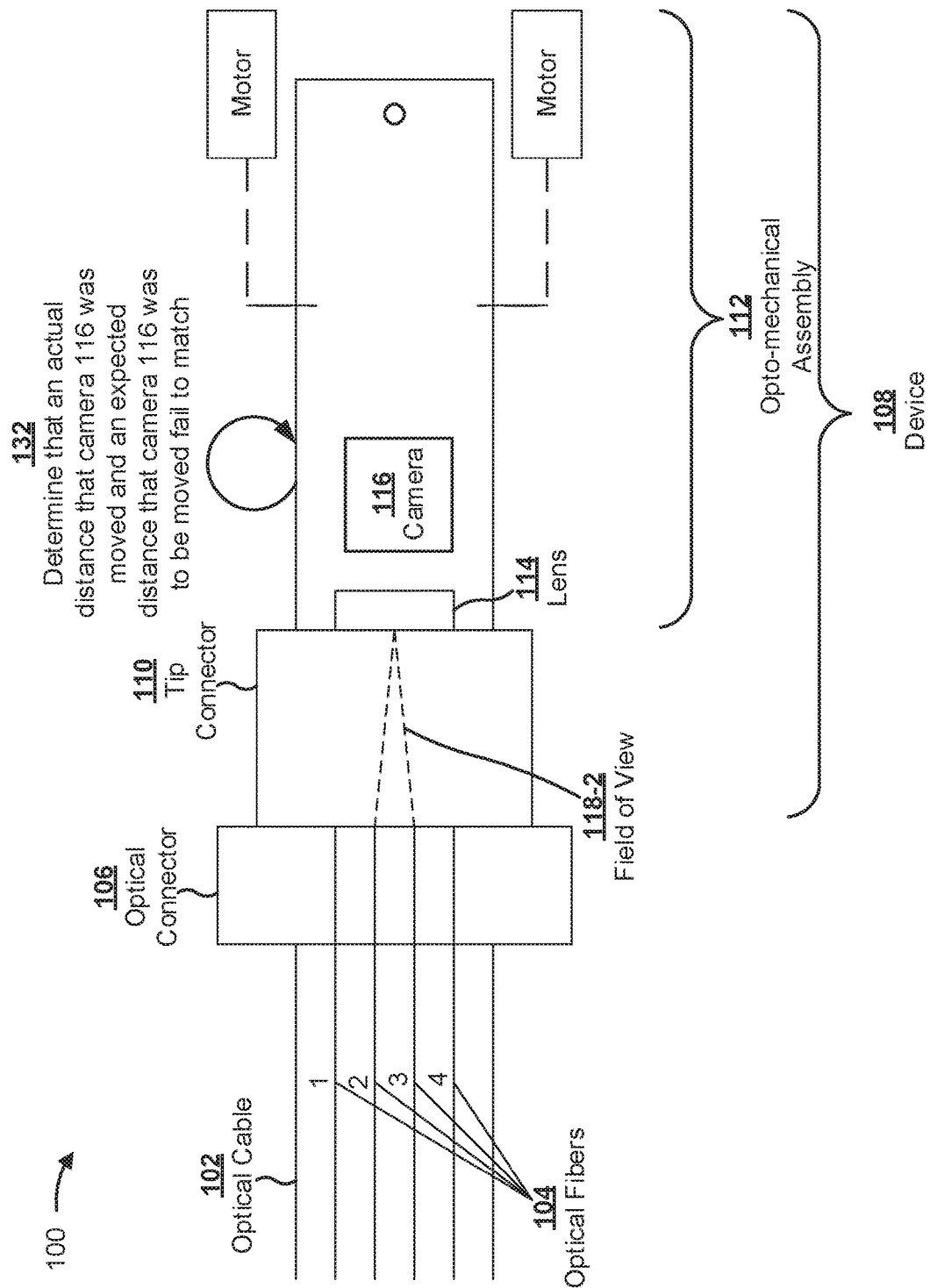

Turning to FIG. 1G, and as shown by reference number 132, device 108 may determine that an actual distance that camera 116 was moved and an expected distance that camera 116 was moved fail to match. For example, based on a result of performing the comparison of the first image and the second image, device 108 may determine an error in movement of camera 116 (e.g., may determine that camera 116 has not be moved an expected distance).

In some implementations, device 108 may determine an amount by which to adjust field of view 118 of camera 116. For example, device 108 may determine the amount by which to adjust field of view 118-2 based on determining that the first image and the second image overlap. In some implementations, adjusting a field of view of camera 116 may include moving camera 116 and/or modifying a position of camera 116, moving optical cable 102 and/or optical connector 106, modifying a position of optical cable 102 and/or optical connector 106, and/or the like.

In some implementations, device 108 may determine an amount by which to adjust field of view 118-2 based on an amount by which the first image and the second image overlap (e.g., a distance that overlaps between the first image and the second image). For example, device 108 may determine an amount by which to adjust field of view 118-1 based on a percentage of the first image and the second image that overlap (e.g., a percentage may indicate a distance based on a configuration of optical cable 102, an amount of distance within field of view 118-2, and/or the like), a quantity of pixels that overlap between the first image and the second image (e.g., a pixel may correspond a particular amount of distance shown in an image), and/or the like.

In some implementations, if there is no overlap between the first image and the second image, device 108 may determine an amount by which to adjust field of view 118 based on an expected location of the first image and/or the second image. For example, device 108 may identify an overlap of the first image and the initial set of images described above based on a comparison of the first image and the initial set of images and may identify an overlap between the second image and the initial set of images. Continuing with the previous example, device 108 may determine an amount of distance between the first set of optical fibers 104 shown in the first image and the second set of optical fibers 104 shown in the second image based on identifying the overlaps between the first image and the initial set of images and between the second image and the initial set of images. As specific examples, device 108 may determine a quantity of pixels between the first image and the second image based on identifying the overlaps, may determine a quantity of optical fibers 104 between the first set of optical fibers 104 shown in the first image and the second set of optical fibers 104 shown in the second image based on identifying the overlaps, and/or the like.

Figure 1H:
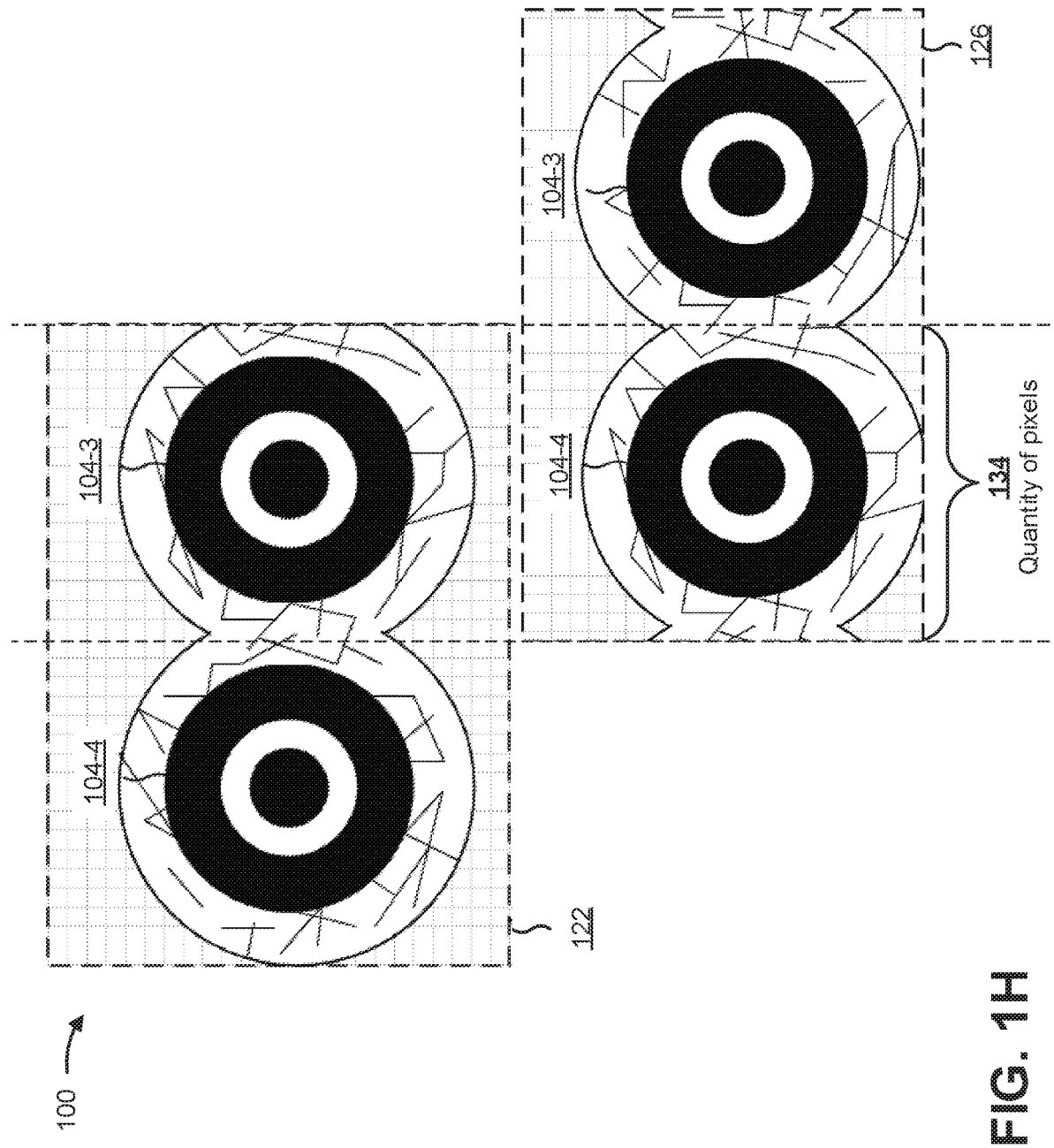

FIG. 1H shows an example of determining an amount by which to adjust field of view 118-2 of camera 116. As shown by reference number 134, device 108 may determine a quantity of pixels that overlap between the first image (shown by reference number 122) and the second image (shown by reference number 126). In this case, for example, each pixel may show a particular distance of optical cable 102 (e.g., based on a configuration of optical cable 102, based on a distance of camera 116 from optical cable 102, based on an amount of zoom implemented by camera 116, based on a resolution of camera 116, and/or the like). For example, the further camera 116 is from optical cable 102, the less zoom implemented by camera 116, the less resolution of camera 116, and/or the like, the more distance each pixel may show.

Figure 1I:
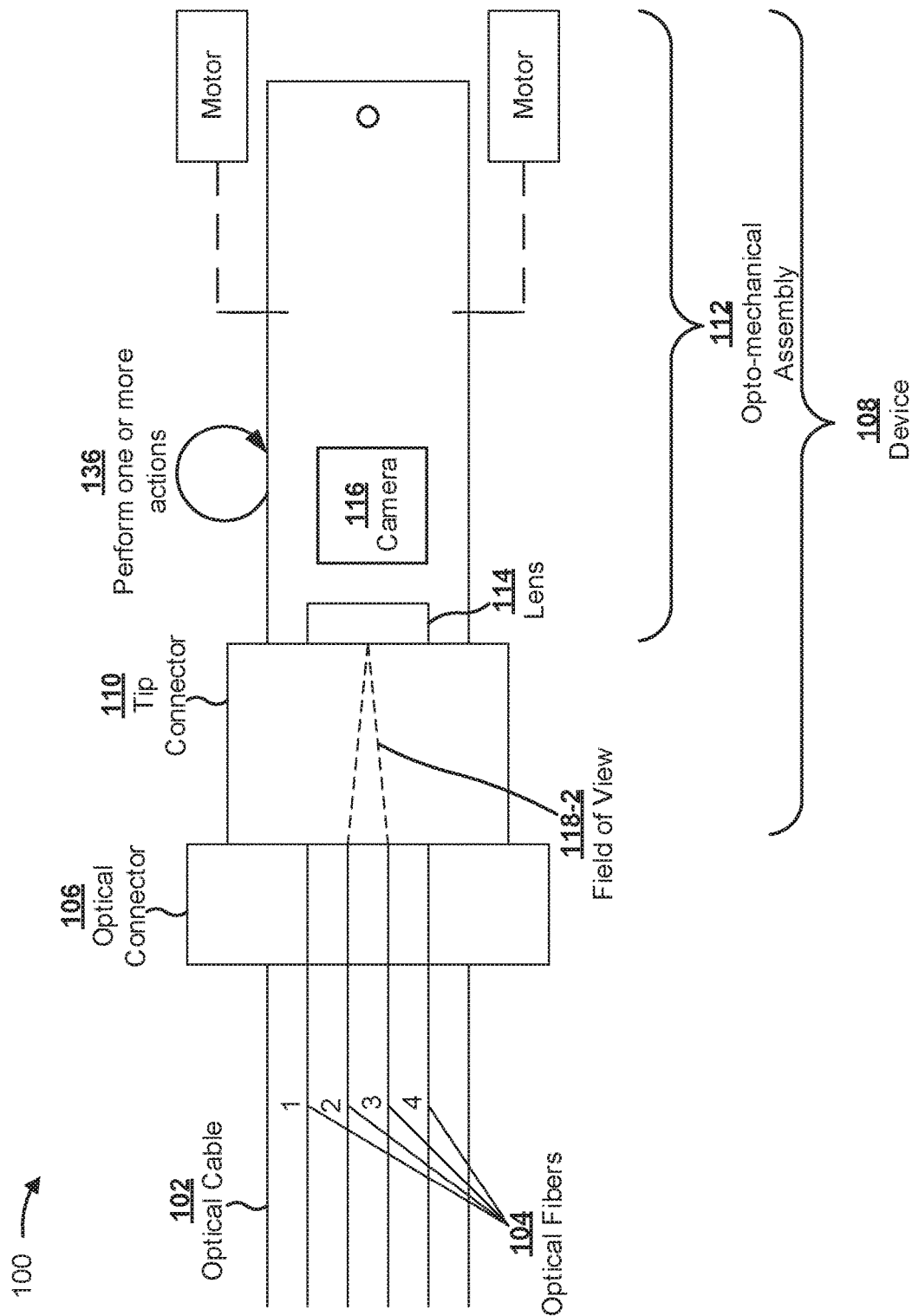

Turning to FIG. 1I, and as shown by reference number 136, device 108 may perform one or more actions. For example, device 108 may perform one or more actions after determining the amount by which to adjust field of view 118-2 of camera 116.

In some implementations, device 108 may move camera 116 (and/or optical cable 102 and/or optical connector 106) by the amount by which field of view 118-2 is to be adjusted (e.g., may move camera 116 in a particular direction by the amount). For example, device 108 may modify a position of camera 116 (and/or optical cable 102 and/or optical connector 106) by a difference between the actual distance that camera 116 was moved and the expected distance that camera 116 was to be moved. As a specific example, device 108 may move camera 116 (and/or optical cable 102 and/or optical connector 106) from the second position associated with field of view 118-2 toward the first position of camera 116 associated with field of view 118-1 when device 108 determines that camera 116 was moved more than an expected distance. As another specific example, device 108 may move camera 116 (and/or optical cable 102 and/or optical connector 106) from the second position associated with field of view 118-2 away from the first position when device 108 determines that device 108 moved camera 116 less than an expected distance.

In some implementations, device 108 may determine to adjust a future movement of camera 116 (and/or optical cable 102 and/or optical connector 106) based on a difference between an actual distance that device 108 moved camera 116 and an expected distance that device 108 was to move camera 116. For example, if device 108 determines that camera 116 was moved less than an expected distance, then device 108 may determine to increase a next movement of camera 116 (and/or optical cable 102 and/or optical connector 106) by an amount equal to a difference between the actual distance and the expected distance. Similarly, and as another example, if device 108 determines that camera 116 (and/or optical cable 102 and/or optical connector 106) was moved more than an expected distance, then device 108 may determine to decrease a next movement of camera 116 by an amount equal to a difference between the actual distance and the expected distance.

Additionally, or alternatively, device 108 may move camera 116 (and/or optical cable 102 and/or optical connector 106) to a previous position associated with the first image and may move camera 116 based on the amount by which field of view 118-2 is to be adjusted. Additionally, or alternatively, device 108 may output a notification for display that includes information indicating that device 108 has identified an error in movement of camera 116. Additionally, or alternatively, device 108 may trigger an alarm (e.g., may output a sound, may activate a light, and/or the like) to indicate that device 108 has identified an error in movement of camera 116. Additionally, or alternatively, device 108 may send a message (e.g., a text message, an email, and/or the like) to another device (e.g., a user device, such as a mobile phone, a desktop computer, and/or the like) that includes information indicating that device 108 has identified an error in movement of camera 116.

In some implementations, device 108 may store information that includes a timestamp for an identified error, an amount by which field of view 118-2 was adjusted, a type of optical cable 102 of which images were being captured (e.g., a size of optical cable 102, a configuration of optical fibers 104 included in optical cable 102, and/or the like), and/or the like. For example, device 108 may process this information to identify a trend related to errors identified in movement of camera 116, such as errors over time, which may indicate that mechanical components of device 108 need to receive maintenance services, errors with respect to particular types of optical cables 102, which may indicate that device 108 needs to be specifically configured for those types of optical cables 102, and/or the like.

In this way device, 108 may determine when a distance that device 108 has moved camera 116 does not match an expected distance due to a mechanical error related to device 108, due to movement by a user of device 108, and/or the like), and may compensate for this in future movements of device 108. This improves an analysis of optical fibers 104 of optical cable 102 by reducing or eliminating compounding of movement errors to future movements. In addition, this conserves processing resources of device 108 and/or time resources that would otherwise be consumed re-capturing images of optical fibers 104. Further, this reduces an amount of skill needed by a technician using device 108, as device 108 may be capable of compensating for a lack of steady positioning by the technician.

As indicated above, FIGS. 1A-1I are provided merely as an example. Other examples are possible and may differ from what was described with regard to FIGS. 1A-1I. Although some implementations described with regard to FIGS. 1A-1I include performing a comparison of two images, the implementations apply equally to performing a comparison of any number of images, such as three images, four images, etc.

In addition, although some implementations describe moving camera 116 to modify field of view 118 of camera 116, some implementations may include moving optical cable 102 (and/or optical connector 106 associated with optical cable 102) to modify field of view 118 of camera 116. For example, optical cable 102 (and/or optical connector 106) and camera 116 may be moved relative to each other via a relative movement to cause field of view 118 of camera 116 to be modified. Continuing with the previous example, a relative movement may include a movement of optical cable 102 (and/or optical connector 106) relative to camera 116, a movement of camera 116 relative to optical cable 102 (and/or optical connector 106), and/or a combination of a movement of optical cable 102 (and/or optical connector 106) relative to camera 116 and a movement of camera 116 relative to optical cable 102 (and/or optical connector 106). In some implementations, device 108 may include one or more components that are configured to move optical cable 102 (and/or optical connector 106 associated with optical cable 102). In other words, descriptions of movement of camera 116, descriptions of modification of a position of camera 116, and/or the like equally apply to a movement and/or modification of a position of optical cable 102, optical connector 106, and/or the like.

In addition, although FIGS. 1A-1I describe an example of using, for example, a unique visual pattern of interstitial material shown in images to adjust a positioning of optical cable 102 and/or camera 116, other uses of the unique visual pattern are possible. For example, the unique visual pattern, which may uniquely identify optical cable 102 and/or a particular optical fiber 104 of optical cable 102, can be used to track a location of installation of optical cable 102 and/or optical fiber 104, to verify that a technician is performing scheduled maintenance and/or servicing of optical cable 102 and/or optical fiber 104, to schedule maintenance and/or servicing of optical cable 102 and/or optical fiber 104 (e.g., via communication between device 108 and a client/server device), to provision, for a user of device 108, information specific to optical cable 102 and/or optical fiber 104 during servicing and/or maintenance of optical cable 102 and/or optical fiber 104, and/or the like.

Figure 2:
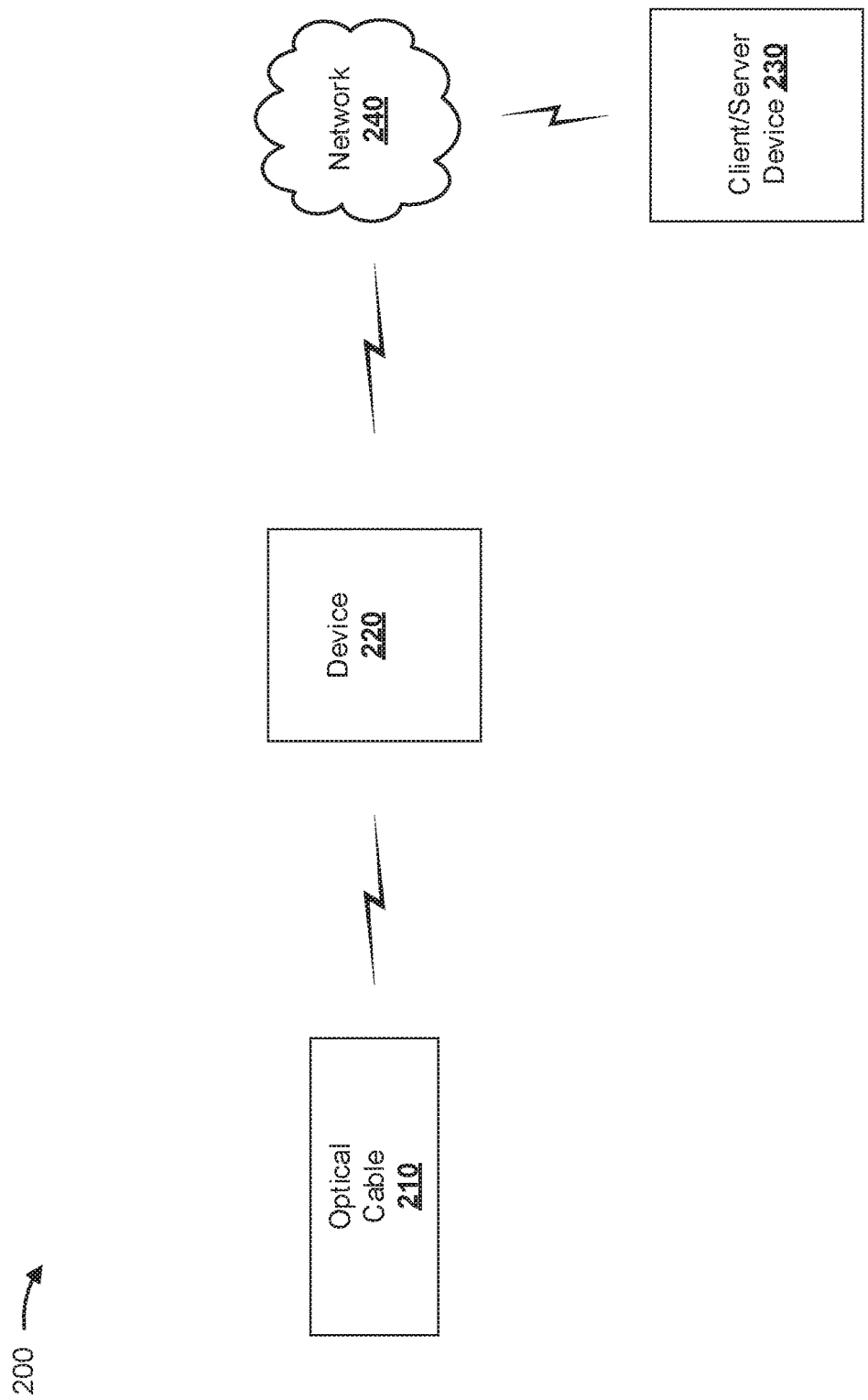
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include optical cable 210, device 220, a client device or a server device (hereinafter referred to as client/server device 230), and network 240. Devices of environment 200 may interconnect via wired connections, wireless connections, or a combination of wired and wireless connections.

Optical cable 210 includes a cable containing one or more optical fibers that are to be used to carry light from a source device to a destination device. For example, optical cable 210 may include a ribbon optical cable, a loose tube optical cable, a drop optical cable, a central core cable, and/or a similar type of cable. In some implementations, optical cable 210 may be connected to device 220 (e.g., via an optical connector and/or a tip connector), as described elsewhere herein.

Device 220 includes one or more devices capable of capturing, receiving, storing, generating, processing, and/or providing an image of an optical fiber of optical cable 210. For example, device 220 may include an optical probe, an optical fiber microscope, a fault locator, an optical fiber inspection microscope, and/or a similar type of device. In some implementations, device 220 may move a camera of optical cable 210 and may capture an image of a set of optical fibers within a field of view of the camera, as described elsewhere herein. Additionally, or alternatively, device 220 may detect an error in capturing an image of a set of optical fibers of an optical cable, as described elsewhere herein.

Client/server device 230 includes one or more devices capable of receiving, generating, storing, processing, and/or providing an image of an optical fiber of an optical cable. For example, client/server device 230 may include a desktop computer, a mobile phone (e.g., a smart phone or a radiotelephone), a laptop computer, a tablet computer, a wearable communication device (e.g., a smart wristwatch or a pair of smart eyeglasses), a server device, a computing resource, or a similar type of device. In some implementations, client/server device 230 may receive an image captured by device 220, as described elsewhere herein.

Network 240 includes one or more wired and/or wireless networks. For example, network 240 may include a wireless network (e.g., a long-term evolution (LTE) network, a code division multiple access (CDMA) network, a 3G network, a 4G network, a 5G network, a Wi-Fi network, or another type of wireless network), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
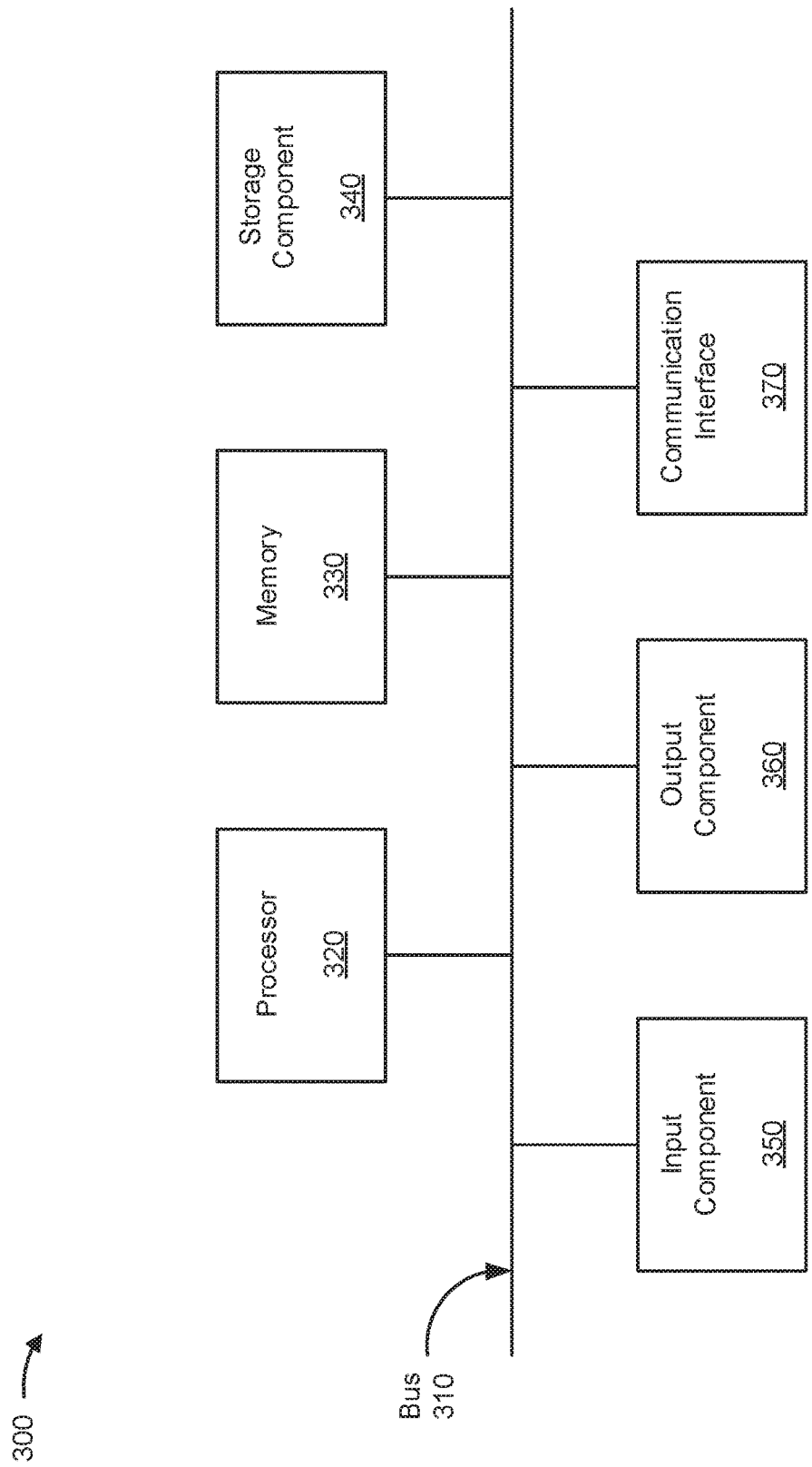
FIG. 3 is a diagram of example components of one or more devices of FIG. 2.

FIG. 3 is a diagram of example components of a device 300. Device 300 may correspond to device 220 and/or to client/server device 230. In some implementations, device 220 and/or client/server device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
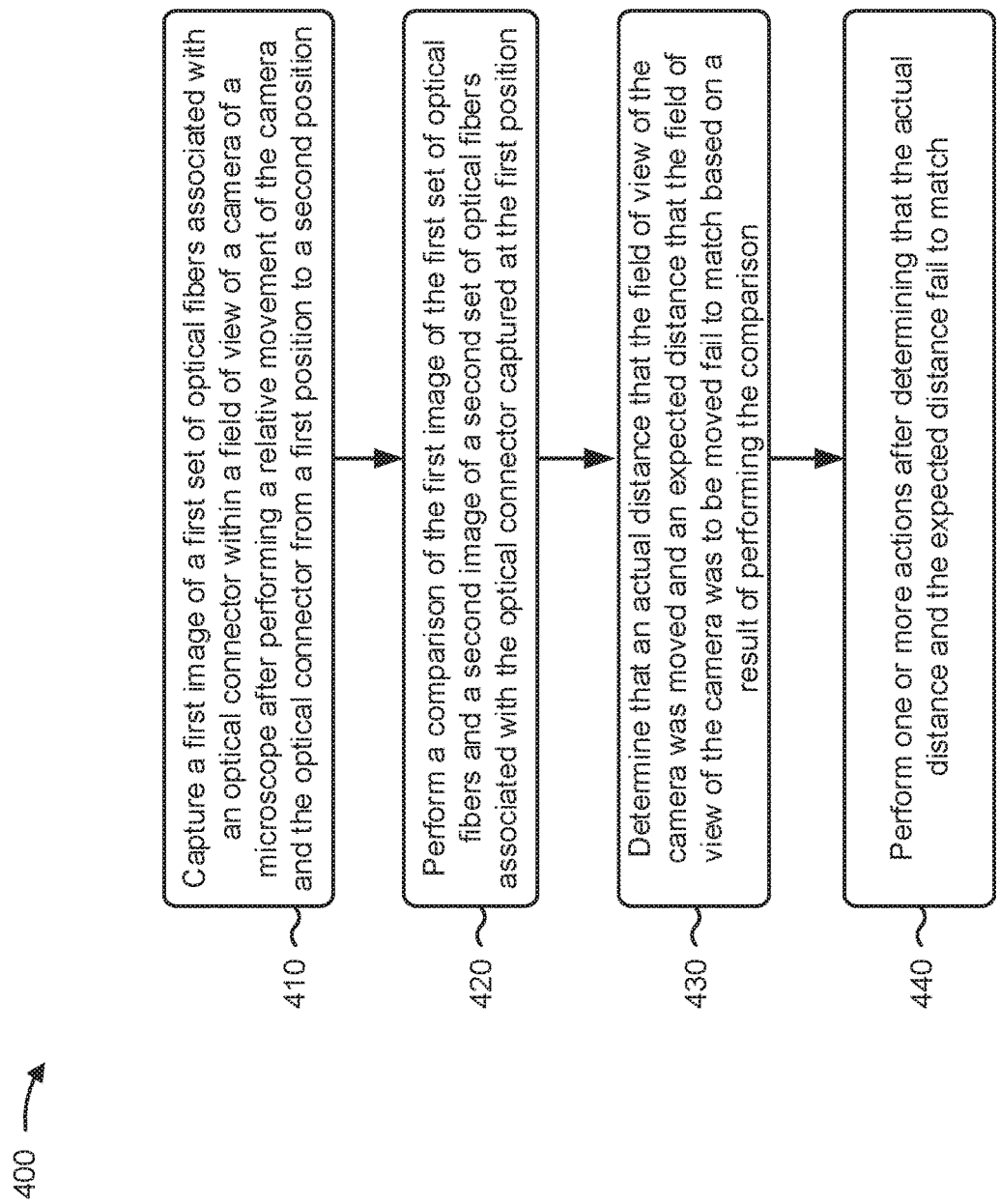
FIG. 4 is a flow chart of an example process for determining an error in a moving distance of a microscope.

FIG. 4 is a flow chart of an example process 400 for determining an error in a moving distance of a microscope. In some implementations, one or more process blocks of FIG. 4 may be performed by a device (e.g., device 220). In some implementations, one or more process blocks of FIG. 4 may be performed by another device or a group of devices separate from or including the device, such as a client/server device (e.g., client/server device 230).

As shown in FIG. 4, process 400 may include capturing a first image of a first set of optical fibers associated with an optical connector within a field of view of a camera of a microscope after performing a relative movement of the camera and the optical connector from a first position to a second position (block 410). For example, the device (e.g., device 220 using camera 116, processor 320, and/or the like) may capture a first image of a first set of optical fibers associated with an optical connector within a field of view of a camera after performing a relative movement of the camera and the optical connector from a first position to a second position, in a manner that is the same as or similar to that described with regard to FIGS. 1A-1I.

As further shown in FIG. 4, process 400 may include performing a comparison of the first image of the first set of optical fibers and a second image of a second set of optical fibers associated with the optical connector captured at the first position (block 420). For example, the device (e.g., device 220 using processor 320, memory 330, and/or the like) may perform a comparison of the first image of the first set of optical fibers and a second image of a second set of optical fibers of the optical cable captured at the first position, in a manner that is the same as or similar to that described with regard to FIGS. 1A-1I.

As further shown in FIG. 4, process 400 may include determining that an actual distance that the field of view of the camera was moved and an expected distance that the field of view of the camera was to be moved fail to match based on a result of performing the comparison (block 430). For example, the device (e.g., device 220 using processor 320) may determine that an actual distance that the field of view of the camera was moved and an expected distance that the field of view of the camera was to be moved fail to match based on a result of performing the comparison, in a manner that is the same as or similar to that described with regard to FIGS. 1A-1I.

As further shown in FIG. 4, process 400 may include performing one or more actions after determining that the actual distance and the expected distance fail to match (block 440). For example, the device (e.g., device 220 using processor 320, memory 330, storage component 340, output component 360, communication interface 370, and/or the like) may perform one or more actions after determining that the actual distance and the expected distance fail to match, in a manner that is the same as or similar to that described with regard to FIGS. 1A-1I.

Process 400 may include additional implementations, such as any single implementation or any combination of implementations described below and/or in connection with one or more other processes described elsewhere herein.

In some implementations, the device may determine a quantity of pixels that overlap between the first image and the second image, and may determine that the actual distance and the expected distance fail to match based on the quantity of pixels that overlap between the first image and the second image. In some implementations, the device may modify the second position of the camera or the optical connector by a difference between the actual distance and the expected distance after determining that the actual distance and the expected distance fail to match.

In some implementations, the device may determine the expected distance that the camera or the optical connector were to be moved relative to each other based on: a configuration of optical fibers associated with the optical connector, and a quantity of the optical fibers to be included in the field of view of the camera. In some implementations, the device may determine that the actual distance and the expected distance fail to match after determining the expected distance. In some implementations, the device may determine an expected quantity of pixels expected to overlap between the first image and the second image after capturing the first image, and may determine that an actual quantity of pixels that overlap between the first image and the second image differs from the expected quantity of pixels after determining the expected quantity of pixels. In some implementations, the device may determine that the actual distance and the expected distance fail to match after determining that the actual quantity of pixels differs from the expected quantity of pixels.

In some implementations, the device may capture the second image prior to performing the relative movement of the camera and the optical connector from the first position to the second position. In some implementations, the device may output a notification for display via a display of the microscope, wherein the notification includes information that identifies that the actual distance and the expected distance fail to match.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
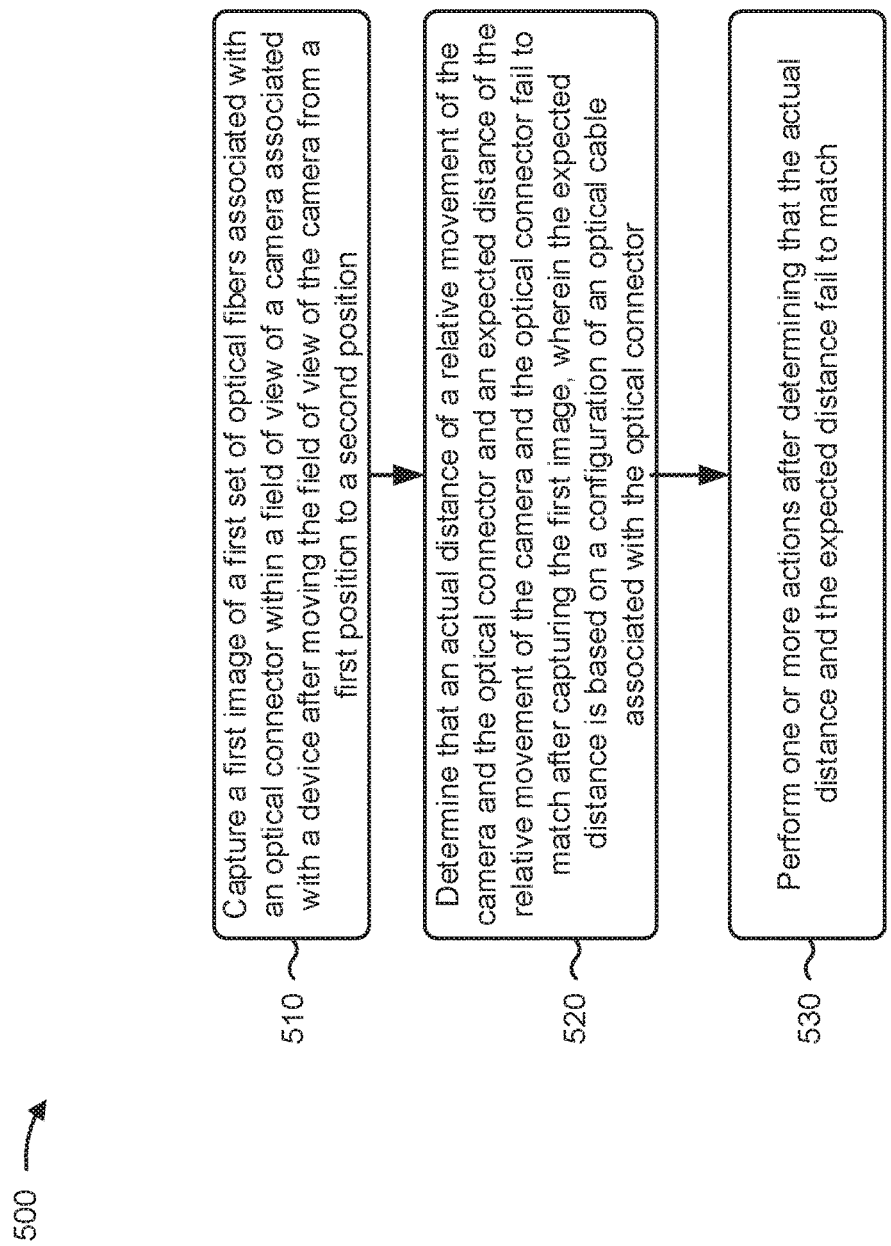
FIG. 5 is a flow chart of an example process for determining an error in a moving distance of a microscope.

FIG. 5 is a flow chart of an example process 500 for determining an error in a moving distance of a microscope. In some implementations, one or more process blocks of FIG. 5 may be performed by a device (e.g., device 220). In some implementations, one or more process blocks of FIG. 5 may be performed by another device or a group of devices separate from or including the device, such as a client/server device (e.g., client/server device 230).

As shown in FIG. 5, process 500 may include capturing a first image of a first set of optical fibers associated with an optical connector within a field of view of a camera associated with a device after moving the field of view of the camera from a first position to a second position (block 510). For example, the device (e.g., device 220 using camera 116, processor 320, and/or the like) may capture a first image of a first set of optical fibers associated with an optical connector within a field of view of a camera associated with a device after moving the field of view of the camera from a first position to a second position, in a manner that is the same as or similar to that described with regard to FIGS. 1A-1I.

As further shown in FIG. 5, process 500 may include determining that an actual distance of a relative movement of the camera and the optical connector and an expected distance of the relative movement of the camera and the optical connector fail to match after capturing the first image, wherein the expected distance is based on a configuration of an optical cable associated with the optical connector (block 520). For example, the device (e.g., device 220 using processor 320, memory 330, and/or the like) may determine that an actual distance of a relative movement of the camera and the optical connector and an expected distance of the relative movement of the camera and the optical connector fail to match after capturing the first image, in a manner that is the same as or similar to that described with regard to FIGS. 1A-1I. In some implementations, the expected distance is based on a configuration of an optical cable associated with the optical connector.

As further shown in FIG. 5, process 500 may include performing one or more actions after determining that the actual distance and the expected distance fail to match (block 530). For example, the device (e.g., device 220 using processor 320, memory 330, storage component 340, output component 360, communication interface 370, and/or the like) may perform one or more actions after determining that the actual distance and the expected distance fail to match, in a manner that is the same as or similar to that described with regard to FIGS. 1A-1I.

Process 500 may include additional implementations, such as any single implementation or any combination of implementations described below and/or in connection with one or more other processes described elsewhere herein.

In some implementations, the device may determine that the first image and a second image of a second set of optical fibers captured at the first position do not overlap after determining that the actual distance and the expected distance fail to match, and may perform another relative movement of the camera and the optical connector toward the first position by a threshold distance to a third position after determining that the first image and the second image do not overlap. In some implementations, the device may capture a third image of a third set of optical fibers associated with the optical connector within the field of view of the camera at the third position after performing the relative movement of the camera and the optical connector toward the first position by the threshold distance, and may determine whether the third image and the second image overlap after capturing the third image.

In some implementations, the device may determine that an actual quantity of pixels between a first center point of the first image and a second center point of a second image of a second set of optical fibers captured at the first position and an expected quantity of pixels between the first center point and the second center point fail to match, wherein the first image and the second image overlap. In some implementations, the device may determine that the actual distance and the expected distance fail to match after determining that the actual quantity of pixels and the expected quantity of pixels fail to match.

In some implementations, the device may modify a distance of a movement by an amount equal to a difference between the actual distance and the expected distance after determining that the actual distance and the expected distance fail to match. In some implementations, the device may detect a trend related to a difference between multiple actual differences and multiple expected differences after determining that the actual distance and the expected distance fail to match, and may output a notification for display via a display associated with the device that includes information that identifies the trend after detecting the trend.

In some implementations, the device may adjust a position of the camera or the optical connector from the second position to a third position after determining that the actual distance and the expected distance fail to match. In some implementations, the device may determine that the actual distance and the expected distance fail to match based on a first quantity of pixels of the first image and a second quantity of pixels of a second image of a second set of optical fibers captured at the first position that overlap.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
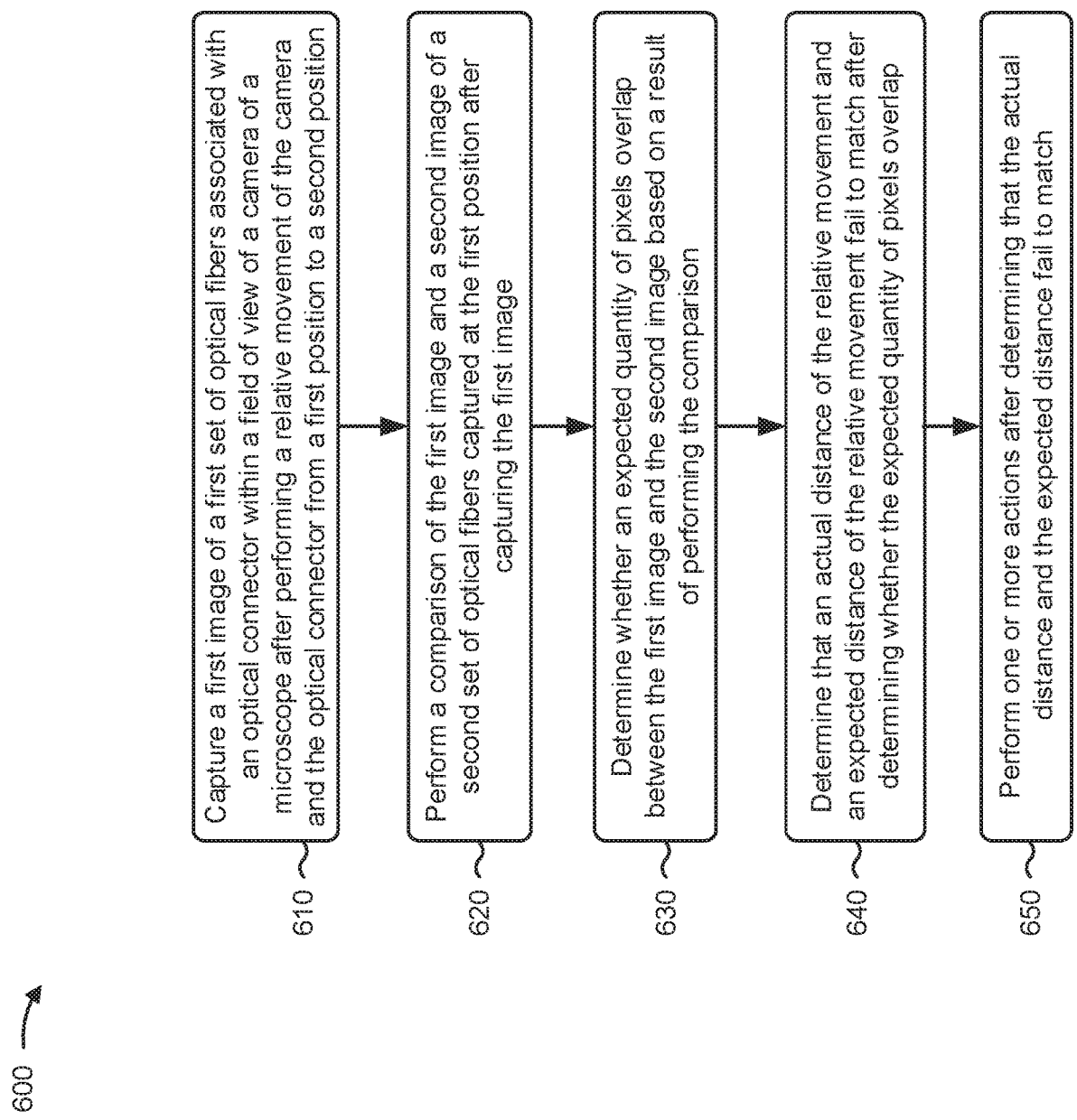
FIG. 6 is a flow chart of an example process for determining an error in a moving distance of a microscope.

FIG. 6 is a flow chart of an example process 600 for determining an error in a moving distance of a microscope. In some implementations, one or more process blocks of FIG. 6 may be performed by the device (e.g., device 220). In some implementations, one or more process blocks of FIG. 6 may be performed by another device or a group of devices separate from or including the device, such as a client/server device (e.g., client/server device 230).

As shown in FIG. 6, process 600 may include capturing a first image of a first set of optical fibers associated with an optical connector within a field of view of a camera of a microscope after performing a relative movement of the camera and the optical connector from a first position to a second position (block 610). For example, the device (e.g., device 220 using camera 116, processor 320, and/or the like) may capture a first image of a first set of optical fibers associated with an optical connector within a field of view of a camera of a microscope after performing a relative movement of the camera and the optical connector from a first position to a second position, in a manner that is the same as or similar to that described with regard to FIGS. 1A-1I.

As further shown in FIG. 6, process 600 may include performing a comparison of the first image and a second image of a second set of optical fibers captured at the first position after capturing the first image (block 620). For example, the device (e.g., device 220 using processor 320, and/or the like) may perform a comparison of the first image and a second image of a second set of optical fibers captured at the first position after capturing the first image, in a manner that is the same as or similar to that described with regard to FIGS. 1A-1I.

As further shown in FIG. 6, process 600 may include determining whether an expected quantity of pixels overlap between the first image and the second image based on a result of performing the comparison (block 630). For example, the device (e.g., device 220 using processor 320, and/or the like) may determine whether an expected quantity of pixels overlap between the first image and the second image based on a result of performing the comparison, in a manner that is the same as or similar to that described with regard to FIGS. 1A-1I. In some implementations, the overlap indicates an error in the moving of the camera.

As further shown in FIG. 6, process 600 may include determining that an actual distance of the relative movement and an expected distance of the relative movement fail to match after determining whether the expected quantity of pixels overlap (block 640). For example, the device (e.g., device 220 using processor 320, and/or the like) may determine that an actual distance that the camera was moved and an expected distance that the camera was to be moved fail to match after determining whether the expected quantity of pixels overlap, in a manner that is the same as or similar to that described with regard to FIGS. 1A-1I.

As further shown in FIG. 6, process 600 may include performing one or more actions after determining that the actual distance and the expected distance fail to match (block 650). For example, the device (e.g., device 220 using processor 320, and/or the like) may perform one or more actions after determining that the actual distance and the expected distance fail to match, in a manner that is the same as or similar to that described with regard to FIGS. 1A-1I.

Process 600 may include additional implementations, such as any single implementation or any combination of implementations described below and/or in connection with one or more other processes described elsewhere herein.

In some implementations, the device may determine the expected quantity of pixels that is to overlap between the first image and the second image after capturing the first image, and may determine whether the expected quantity of pixels overlap after determining the expected quantity of pixels that is to overlap. In some implementations, the device may modify a position of the camera or the optical connector from the second position to a third position based on a difference between the actual distance and the expected distance.

In some implementations, the device may receive information that identifies a configuration of an optical cable associated with the optical connector prior to capturing the first image, and may perform a movement of the camera or the optical connector based on the information that identifies the configuration of the optical cable. In some implementations, the device may perform a first movement of the camera or the optical connector to the first position after determining whether the expected quantity of pixels overlap, and may perform a second movement of the camera or the optical connector to the second position after performing the first movement. In some implementations, the device may perform the comparison of a first portion of the first image and a second portion of the second image, and may determine whether the expected quantity of pixels overlap after performing the comparison of the first portion and the second portion.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

In this way, the device may detect an error related to a distance that the device moved a camera associated with the device and/or may compensate for the error. This improves functioning of the device may reducing or eliminating compounding of errors across multiple movements. In addition, this conserves power resources and/or computing resources of the device related to moving a camera associated with the device by reducing or eliminating a need for the device to reposition the camera due to the error. Further, this provides an automatic and efficient way for the device to detect and/or to compensate for errors in movement of a camera, thereby reducing or eliminating a need for a user of the device to manually detect an error in movement of the device, which may not be possible in some cases.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related items, and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
    capturing, using a camera associated with a microscope, a first image of a first set of optical fibers associated with an optical connector after performing a relative movement of the camera and the optical connector from a first position to a second position;
    identifying, by the microscope, a first visual pattern of interstitial material associated with the first set of optical fibers in the first image;
    performing, by the microscope, a comparison of the first image of the first set of optical fibers and a second image of a second set of optical fibers associated with the optical connector captured at the first position,
        wherein performing the comparison comprises comparing the first visual pattern of interstitial material shown in the first image and a second visual pattern of interstitial material shown in the second image;
    determining, by the microscope, that an actual distance of the relative movement of the camera and the optical connector and an expected distance of the relative movement of the camera and the optical connector fail to match based on a result of performing the comparison; and
    performing, by the microscope, one or more actions after determining that the actual distance and the expected distance fail to match.

2. The method of claim 1, further comprising:
    determining an amount of overlap between the first image and the second image; and
    wherein determining that the actual distance and the expected distance fail to match comprises:
        determining that the actual distance and the expected distance fail to match based on the amount of overlap between the first image and the second image.

3. The method of claim 1, wherein performing the one or more actions comprises:
    modifying the second position of the camera or the optical connector by a difference between the actual distance and the expected distance after determining that the actual distance and the expected distance fail to match.

4. The method of claim 1, further comprising:
    determining the expected distance that the camera or the optical connector were to be moved relative to each other based on:
        a configuration of optical fibers associated with the optical connector, and
        a quantity of the optical fibers to be included in a field of view of the camera; and
    wherein determining that the actual distance and the expected distance fail to match comprises:
        determining that the actual distance and the expected distance fail to match after determining the expected distance.

5. The method of claim 1, further comprising:
  determining an expected quantity of pixels expected to overlap between the first image and the second image after capturing the first image; and
  determining that an actual quantity of pixels that overlap between the first image and the second image differs from the expected quantity of pixels after determining the expected quantity of pixels; and
  wherein determining that the actual distance and the expected distance fail to match comprises:
    determining that the actual distance and the expected distance fail to match after determining that the actual quantity of pixels differs from the expected quantity of pixels.

6. The method of claim 1, further comprising:
  capturing the second image prior to performing the relative movement of the camera and the optical connector from the first position to the second position.

7. The method of claim 1, wherein performing the one or more actions comprises:
  outputting a notification for display via a display of the microscope,
    wherein the notification includes information that identifies that the actual distance and the expected distance fail to match.

8. A device, comprising:
  one or more memories; and
  one or more processors, communicatively coupled to the one or more memories, configured to:
  capture, using a camera associated with the device, a first image of a first set of optical fibers associated with an optical connector after moving the camera from a first position to a second position;
  identify a first visual pattern of interstitial material associated with the first set of optical fibers;
  determine that an actual distance of a relative movement of the camera and the optical connector and an expected distance of the relative movement of the camera and the optical connector fail to match after capturing the first image, wherein the expected distance is based on a configuration of an optical cable associated with the optical connector,
    wherein the expected distance is based on analyzing the first visual pattern of interstitial material and
    wherein the one or more processors, when determining that the actual distance and the expected distance fail to match, are configured to determine that the actual distance the expected distance fail to match based on a comparison of the first visual pattern of interstitial material shown in the first image and a second visual pattern of interstitial material shown in a second image of a second set of optical fibers captured at the first position; and
  perform one or more actions after determining that the actual distance and the expected distance fail to match.

9. The device of claim 8, wherein the one or more processors are further configured to: determine that the first image and the second image do not overlap after determining that the actual distance and the expected distance fail to match; wherein the one or more processors, when performing the one or more actions, are configured to: perform another relative movement of the camera and the optical connector toward the first position by a threshold distance to a third position after determining that the first image and the second image do not overlap; capture a third image of a third set of optical fibers associated with the optical connector at the third position after performing the relative movement of the camera and the optical connector toward the first position by the threshold distance; and determine whether the third image and the second image overlap after capturing the third image.

10. The device of claim 8, wherein the one or more processors are further configured to: determine that an actual quantity of pixels between a first center point of the first image and a second center point of the second image and an expected quantity of pixels between the first center point and the second center point fail to match, wherein the first image and the second image overlap; and wherein the one or more processors, when determining that the actual distance and the expected distance fail to match, are configured to: determine that the actual distance and the expected distance fail to match after determining that the actual quantity of pixels and the expected quantity of pixels fail to match.

11. The device of claim 8, wherein the one or more processors, when performing the one or more actions, are configured to:
  modify a distance of a movement by an amount equal to a difference between the actual distance and the expected distance after determining that the actual distance and the expected distance fail to match.

12. The device of claim 8, wherein the one or more processors, when performing the one or more actions, are configured to:
  detect a trend related to a difference between multiple actual differences and multiple expected differences after determining that the actual distance and the expected distance fail to match; and
  output a notification for display via a display associated with the device that includes information that identifies the trend after detecting the trend.

13. The device of claim 8, wherein the one or more processors, when performing the one or more actions, are configured to:
  adjust a position of the camera or the optical connector from the second position to a third position after determining that the actual distance and the expected distance fail to match.

14. The device of claim 8, wherein the one or more processors, when determining that the actual distance and the expected distance fail to match, are configured to: determine that the actual distance and the expected distance fail to match based on a first quantity of pixels of the first image and a second quantity of pixels of the second image that overlap.

15. A non-transitory computer-readable medium storing instructions, the instructions comprising:
  one or more instructions that, when executed by one or more processors, cause the one or more processors to:
    capture, using a camera associated with a microscope, a first image of a first set of optical fibers associated with an optical connector after performing a relative movement of the camera and the optical connector from a first position to a second position;
    identify a first visual pattern of interstitial material associated with the first set of optical fibers in the first image;
    perform a comparison of the first image and a second image of a second set of optical fibers captured at the first position after capturing the first image,
      wherein the one or more instructions, that cause the one or more processors to perform the comparison, causes the one or more processors to compare the first visual pattern of interstitial material shown in the first image and a second visual pattern of interstitial material shown in the second image;

determine that an actual distance of the relative movement and an expected distance of the relative movement fail to match based on the comparison; and perform one or more actions after determining that the actual distance and the expected distance fail to match.

16. The non-transitory computer-readable medium of claim 15, wherein the one or more instructions, when executed by the one or more processors, further cause the one or more processors to:

determine an expected quantity of pixels that is to overlap between the first image and the second image after capturing the first image; and determine whether the expected quantity of pixels overlap between the first image and the second image; and wherein the one or more instructions, that cause the one or more processors to determine that the actual distance and the expected distance fail to match, cause the one or more processors to:

determine that the actual distance and the expected distance fail to match based on whether the expected quantity of pixels overlap.

17. The non-transitory computer-readable medium of claim 15, wherein the one or more instructions, that cause the one or more processors to perform the one or more actions, cause the one or more processors to:

modify a position of the camera or the optical connector from the second position to a third position based on a difference between the actual distance and the expected distance.

18. The non-transitory computer-readable medium of claim 15, wherein the one or more instructions, when executed by the one or more processors, further cause the one or more processors to:

receive information that identifies a configuration of an optical cable associated with the optical connector prior to capturing the first image; and wherein the one or more instructions, when executed by the one or more processors, further cause the one or more processors to:

perform a movement of the camera or the optical connector based on the information that identifies the configuration of the optical cable.

19. The non-transitory computer-readable medium of claim 15, wherein the one or more instructions, that cause the one or more processors to perform the one or more actions, cause the one or more processors to:

perform a first movement of the camera or the optical connector to the first position after determining whether an expected quantity of pixels overlap; and perform a second movement of the camera or the optical connector to the second position after performing the first movement.

20. The non-transitory computer-readable medium of claim 15, wherein the one or more instructions, that cause the one or more processors to perform the comparison, cause the one or more processors to:

perform the comparison of a first portion of the first image and a second portion of the second image.

* * * * *